United States Patent [19]

Nilsen et al.

[11] 4,450,789
[45] May 29, 1984

[54] CUP WATERER AND CAGE MOUNT

[75] Inventors: Norman P. Nilsen, Apple Valley; Richard T. Novey, Glendale, both of Calif.

[73] Assignee: CTB, Inc., Milford, Ind.

[21] Appl. No.: 466,054

[22] Filed: Feb. 14, 1983

[51] Int. Cl.³ ............................................. A01K 39/02
[52] U.S. Cl. .......................................... 119/18; 119/75
[58] Field of Search .................. 119/75, 18, 78, 79, 119/80

[56] References Cited

U.S. PATENT DOCUMENTS

| | | | |
|---|---|---|---|
| 1,646,246 | 10/1927 | Hazard | 119/75 |
| 2,921,556 | 1/1956 | Nilsen | 119/74 |
| 3,340,852 | 9/1967 | Nilsen | 119/75 |
| 3,505,978 | 4/1970 | Nilsen | 119/75 |
| 3,707,949 | 1/1973 | Lippi | 119/75 X |
| 3,941,094 | 3/1976 | Nilsen, Jr. | 119/80 |

OTHER PUBLICATIONS

Brochure-Swish Watering Systems for Cages.
Brochure-Swish Watering Systems for Floors.
Brochure-Swish Watering Systems/New Swish "Satellite" Watering System for Starting Chicks and Poults.

Primary Examiner—Hugh R. Chamblee
Attorney, Agent, or Firm—Trexler, Bushnell & Wolters, Ltd.

[57] ABSTRACT

A watering device for confined poultry is offered. The watered includes an upwardly opening cup, and a valve mechanism at the cup bottom. Ears extend from the cup over a valve body to retain the valve body in the cup. These ears can be provided with extensions for engaging a flotation member so as to dispose the flotation member and a valve pin in upright positions even when little or no water is present in the cup. A mounting base attaches to at least one bar of the poultry confinement area, and supports the cup and valve on the cage bar. A cup upper lip has at least one recess adapted to engage a cage bar so as to mount the waterer in a position accessible to the confined poultry.

13 Claims, 9 Drawing Figures

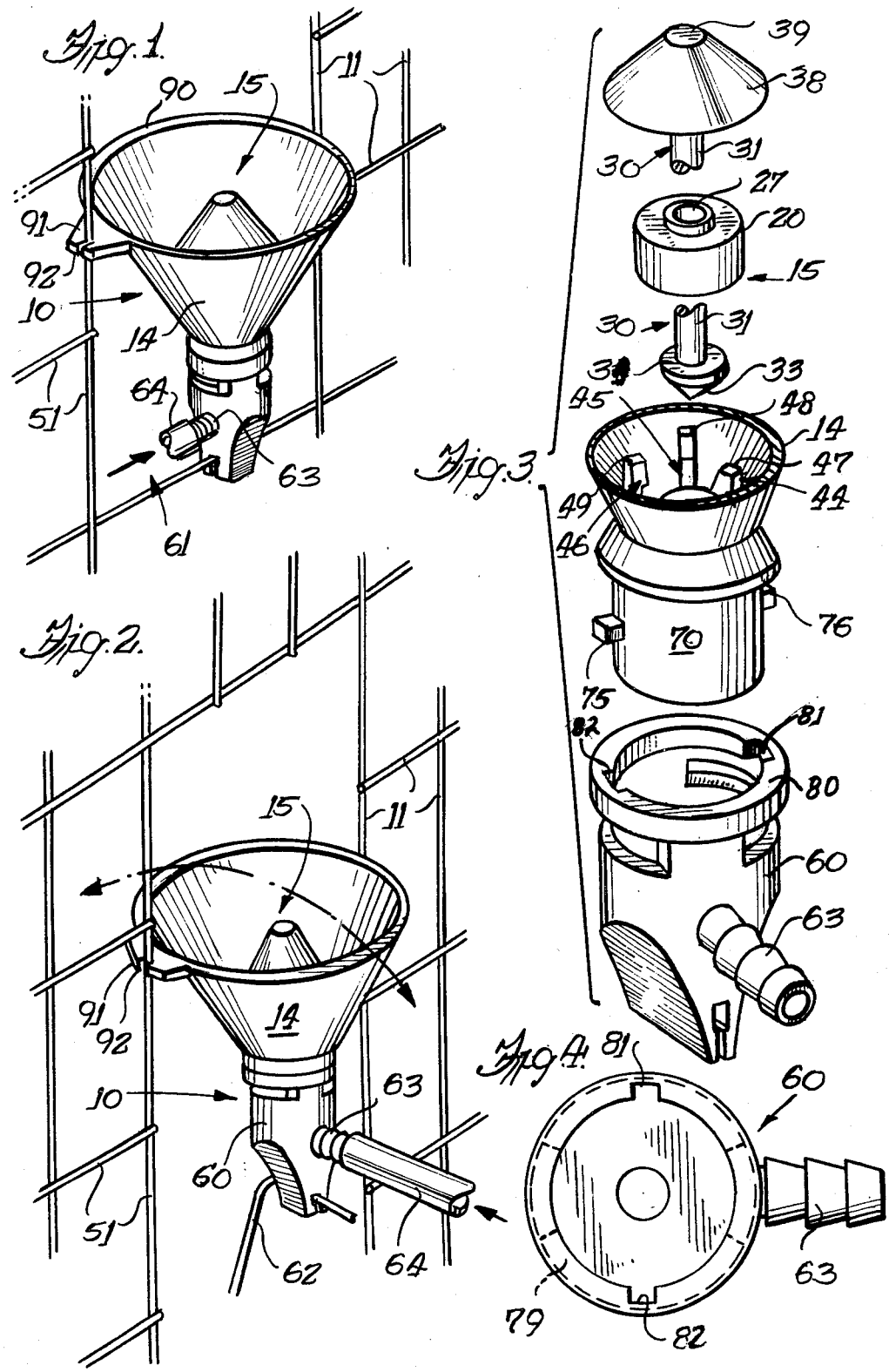

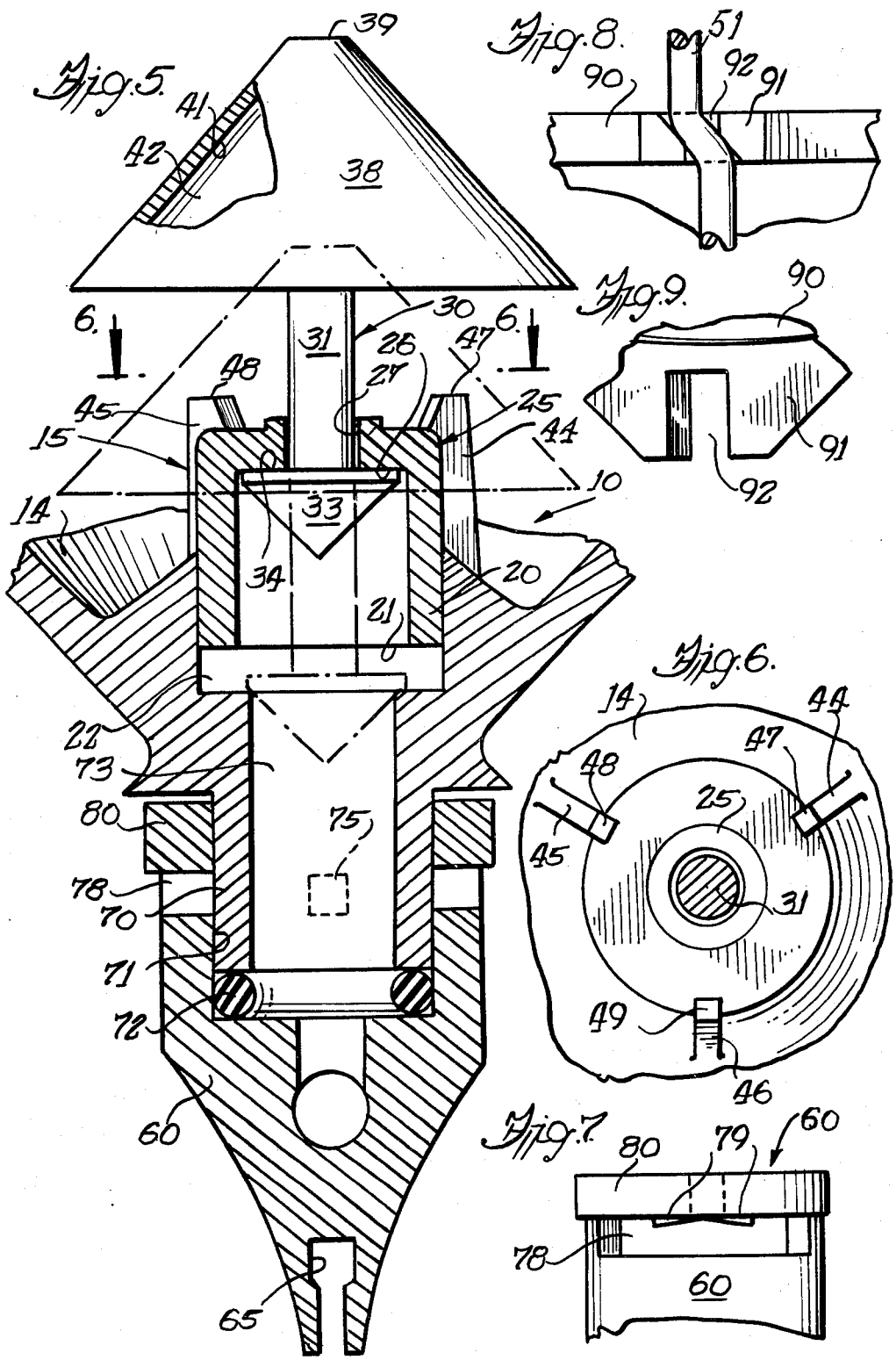

CUP WATERER AND CAGE MOUNT

BACKGROUND OF THE INVENTION

This invention relates generally to watering devices for poultry and the like, and more particularly concerns a cup-type waterer adapted for connection to wire cages or like poultry confinement areas.

Waterers are important devices in modern poultry operations. They must efficiently and reliably deliver water to confined animals, yet they must be manufactured and sold at low cost. Cup-type waterers for poultry and waterer parts are shown and claimed in U.S. Pat. Nos. 2,921,566; 3,340,852; 3,505,978 and 3,941,094.

It is the general object of the present invention to provide a cup-type waterer for poultry which is simple in design and inexpensive to manufacture, yet which is reliable and rugged during use.

Another object is to provide a cup-type waterer for use with a poultry cage which can be mounted in various positions on the side of the cage.

Other objects and advantages of the invention will become apparent upon reading the following detailed description and upon reference to the drawings. Throughout the drawings, like reference numerals refer to like parts.

BRIEF DESCRIPTION OF THE DRAWINGS

FIG. 1 is a perspective view showing the waterer and novel cage attachment arrangement as they appear when attached to the bars of a poultry cage or a like poultry confinement area;

FIG. 2 is a perspective view similar to FIG. 1 but showing the waterer and novel cage attachment arrangement in slightly different configurations as they appear when attached to the differently arranged bars of a poultry cage;

FIG. 3 is an exploded view of the valve mechanism and other bottom portions of the waterer;

FIG. 4 is a top plan view of the bottom attachment device shown in FIG. 3;

FIG. 5 is a fragmentary sectional view taken substantially in the plane of line 5—5 in FIG. 1 and showing in further detail the valve arrangement and bottom attachment element or member;

FIG. 6 is a fragmentary sectional view taken substantially in the plane of line 6—6 in FIG. 5 and showing the top of the valve mechanism;

FIG. 7 is a fragmentary side elevational view showing a top portion of the bottom attachment member;

FIG. 8 is a fragmentary side elevational view of an upper portion of the waterer cup and a cage bar showing the attachment of the cup to the cage bar; and FIG. 9 is a fragmentary top plan view of the waterer cup upper portion shown in FIG. 8.

DETAILED DESCRIPTION

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

Turning first to FIGS. 1-5, there is shown a dripless cup-type waterer 10 for providing water to poultry and like animals confined by a wire cage wall 11. In general, this cup-type waterer 10 includes a generally conical, open cup 14 extending upwardly from a water-admitting valve assembly 15.

As shown in FIGS. 3 and 5, the valve assembly 15 includes a generally hollow body insert element 20 having a lower open end 21 adapted to receive water from the lower portion of a recess 22. This recess 22 is sized and adapted to engage the side of the insert 20 with a frictional fit.

The valve body 20 also defines an upper open end 25. Here, the valve body insert element 20 bends or extends radially inwardly at its upper end 25 to define a valve seat surface 26 and to define a somewhat restricted upper opening 27. A valve pin 30 has a reduced-diameter shank 31 which extends upwardly through the upper valve body opening 27, and past the valve seat 26. An enlarged pin head 33, which can be conical, is disposed inside the valve body 20, and is adapted or shaped for water-flow-inhibiting cooperation with the valve seat 26. When the pin 30 is located in the position shown in solid lines in FIG. 5, an underside 34 of the pin head 33 cooperates with the valve body seat surface 26. This cooperation defines an effective stop which prevents water within the valve body 20 from flowing past the pin 30, out the opening 27, and into the cup 14. However, when the pin 30 is depressed, the pin undercut portion 34 is moved away from contact with the valve body seat 26, and water flows around the pin shank 31 into the cup 14.

The valve is maintained in a closed water-flow-inhibiting condition even when water pressure in the supply line 23 is low. To encourage the pin 30 to be maintained in the valve-closed position shown in solid lines in FIG. 5, an actuator 38 is mounted at a distal pin end 39 above the valve body 20. When the poultry peck at this actuator 38, the pin 30 is momentarily depressed into the water-delivering, valve-open position. However, it will be noted that this actuator 38 is a hollow, conical, umbrella-like element, and that the recessed underside 41 defines an enclosed air space 42. As water flows into the cup 14 and the water level progressively rises, the shape of the actuator 38 traps air within the air space 42. This air entrapment causes the actuator 38 to act as a float member, and to draw the pin 30 in an upward direction into the valve-closed, water-flow-inhibiting position shown in solid lines in FIG. 5.

In accordance with one aspect of the invention, ear structures 44, 45, 46 extend from the cup 14 up and over the valve body 20 so as to retain the valve body 20 securely in the cup 14, as shown in FIGS. 5 and 6. Even unexpectedly high water pressure will not loosen the valve body 20 from its seated position shown in FIG. 5, and will not permit the valve to pop out during use.

In furtherance of this aspect of the invention, the ears 44, 45, 46 are each provided with extensions 47, 48 and 49 positioned and adapted to engage the float member 38 so as to dispose the float member and the depending pin 30 in upright positions even when little or no water is present in the cup 14. In this way, the float member 38 and the pin 30 are positioned so as to encourage them to rise vertically as water flows into the cup, thereby closing the valve 15 and inhibiting further water flow when water reaches a predetermined level within the cup 14.

In accordance with another aspect of the invention, the cup waterer 10 can be mounted in various positions on the side of a poultry-confining cage or other area. As shown in FIGS. 1 and 2, it is common practice to construct poultry cage walls 11 of an array of wire rods 51 which define a pattern of generally rectangular holes. For example, these holes can be one inch by two inches in size, and the wire rods 51 are often formed of 0.080 inch diameter galvanized wire. To form an opening through which the confined poultry can conveniently reach the waterer, one or more wire sections can be broken away to form a window. The cup waterer of the present invention can be conveniently mounted within or adjacent these windows in a variety of positions.

To accommodate this variety of mounting positions, the waterer 10 is provided with a mounting base 60 below the cup 14, which is adapted to engage at least one bar of a poultry confinement area, so as to support the waterer 10 on the bar. As can be envisioned from FIGS. 1-3 and 5, this mounting element 60 includes a projecting barb or nipple 63 adapted for insertion into or other attachment to a water supply hose 64, as shown in FIGS. 1 and 2. The barb or nipple 63 routes water from the hose 64 toward the valve 15.

The mounting base 60 defines, at its lower end, a recessed slot 65 adapted to engage a horizontally disposed cage wire. This cage wire can be an interconnected horizontal cage wire 61 as shown in FIG. 1, or it can be a vertical wire 62 cut and bent horizontally to form a mount wire extension, as shown in FIG. 2.

As will be understood from comparing FIGS. 1 and 2, it is important that this mounting base 60 be securable to the other portions of the waterer 10 in either of at least two positions, each position being spaced substantially 90° from the other. To accomplish this, the cup 14 is provided with a cylindrical extension portion 70, and the mounting base 60 defines a mating cylindrical cavity 71 for receiving the cup cylinder 70. To inhibit leakage, an O-ring 72 can be installed at the bottom of the cylindrical cavity 71 so as to be compressably engaged by the cup cylinder extension 70, as shown in FIG. 5. A water passage 73 extends from the hose 64 into the mounting base 60 and then upwardly to the valve assembly 15.

To secure the mounting base 60 to the cup cylinder 70 in either of the two positions in accordance with the invention, lug elements 75, 76 here extend from the cylindrical extension portion 70, as illustrated in FIGS. 3 and 5. The mounting base 60 defines a recess 77 for receiving and engaging the lugs 75, 76, so as to secure the cup means 14 in the mounting base means 60. As shown particularly in FIG. 7, small bosses 79 can be fored underneath a lip 80 so as to secure and center the lugs 75, 76 in desired positions. Insert setbacks 81, 82 are defined in this lip 80 to permit the lugs 75, 76 to be inserted, as can be envisioned from FIG. 3. By inserting the cylinder 70 into the mounting means 60, and then twisting the mounting means 60 clockwise or counterclockwise, the mounting base 60 can be located in either of the two desired positions.

In carrying out the invention, an upper portion or lip 90 of the watering cup 14 can also be secured to the cage bars 11 as illustrated in FIGS. 1 and 2. To this end, the upper lip 90 is provided with an extension 91 which defines at least one recess 92 adapted to engage a bar 51 defining the poultry confinement area. As illustrated particularly in FIGS. 8 and 9, this recess 92 is defined by a slit, at least a portion of which is oriented at substantially a 45° to an axis of the cup means. When the cup is attached to the bar 51, the bar is twisted slightly (see FIG. 8) for firm, positive engagement with the cage. Cup dislodgement, tipping, and loss are thus discouraged, even though the poultry may use or even abuse the waterer in a rough, active way.

The invention is claimed as follows:

1. A watering device for confined poultry, comprising, in combination, upwardly opening cup means, a hollow valve body extending at least partly into the cup means, the valve body having a lower end adapted for fluid communication with a supply of water, and an upper end defining a valve seat, a valve pin having a shank extending through the valve body upper end, and an enlarged pin head disposed inside the valve body and adapted for water-flow-inhibiting cooperation with the valve seat, but permitting water flow through the upper body end when the pin is moved so as to displace the pin head from the valve seat, mounting base means engaging the cup means and adapted to substantially surround a portion of at least one bar of a poultry confinement area, whereby to support the cup means, valve body means and mounting base means on the confinement bar, and the upwardly opening cup means including an upper lip, said upper lip defining at least one recess adapted to engage at least one bar defining said poultry confinement area, so as to mount said cup means and watering device in a position accessible to the confined poultry.

2. A watering device according to claim 1 wherein said mounting base means defines a water passage connecting said supply of water to said valve body lower end.

3. A water device according to claim 1 wherein said bar-accepting recess in said cup lip is defined by a slit oriented at substantially 45° to an axis of said cup means.

4. A watering device according to claim 1 wherein said cup means is provided with a cylindrical extension portion, and at least one lug extending from the cylindrical extension portion, and wherein said mounting base means defines a cylindrical cavity for receiving the cup cylindrical portion, and a recess for engaging the lug so as to secure said cup means to said mounting base means.

5. A watering device according to claim 4 wherein said recess extends over substantially 90° of cavity arc, so as to secure said cup means to said cylindrical extension in either of two positions spaced substantially 90° from one another.

6. A watering device for confined poultry and the like comprising, in combination, upwardly opening cup means defining a cup bottom, a hollow valve body carried in and on the cup bottom and having a lower end adapted for fluid communication with a supply of water, and an upper end defining a valve seat, ear means extending from the cup over the valve body for retaining the valve body in the cup, a valve pin having a shank extending through the valve body upper end, and an enlarged pin head disposed inside the valve body and adapted for water-flow-inhibiting cooperation with the valve seat, but permitting water flow through the upper valve body end when the pin is moved so as to displace the head from the valve seat.

7. A watering device according to claim 6 wherein said pin shank extends to an end above said valve body, the waterer further including a flotation member affixed to the pin shank end, whereby to assist in closing the valve when water is present in the cup means.

8. A watering device according to claim 7 wherein said flotation member comprises an umbrella member open at its bottom for permitting air to be entrapped within the umbrella member whenever water rises within the cup.

9. A watering device according to claim 8 wherein said umbrella member is substantially conical in shape.

10. A watering device according to claim 7 or 8 wherein said ear means are provided with extension means for engaging said flotation member, so as to dispose the flotation member and the pin in upright positions even when little or no water is present in the cup means.

11. A watering device according to claim 6 further including mounting means engaging the upwardly opening cup means and adapted to substantially surround a portion of at least one bar of a poultry confinement area, whereby to support said cup means, valve body means and mounting base means on the confinement bar.

12. A watering device according to claim 11 wherein said mounting base means defines a water passage connecting said supply of water to said valve body lower end.

13. A watering device according to claim 11 wherein said cup means is provided with a cylindrical extension portion, and at least one lug extending from the cylindrical extension portion, and wherein said mounting base means defines a cylindrical cavity for receiving the cup cylindrical portion, and a recess for engaging the lugs so as to secure said cup means to said mounting base means.

* * * * *